US010223132B2

(12) United States Patent
Mun et al.

(10) Patent No.: US 10,223,132 B2
(45) Date of Patent: Mar. 5, 2019

(54) SYNCHRONIZATION BETWEEN ELECTRONIC DEVICES

(71) Applicant: Samsung Electronics Co., Ltd., Suwon-si, Gyeonggi-do (KR)

(72) Inventors: Tai Kuin Mun, Suwon-si (KR); Dong Jun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 15/794,243

(22) Filed: Oct. 26, 2017

(65) Prior Publication Data
US 2018/0046473 A1    Feb. 15, 2018

Related U.S. Application Data

(62) Division of application No. 14/628,879, filed on Feb. 23, 2015, now Pat. No. 9,830,170.

(60) Provisional application No. 61/943,781, filed on Feb. 24, 2014.

(30) Foreign Application Priority Data

Jul. 3, 2014 (KR) .......................... 10-2014-0083137

(51) Int. Cl.
G06F 9/445    (2018.01)
G02B 27/01    (2006.01)
G06F 8/71     (2018.01)

(52) U.S. Cl.
CPC ........ *G06F 9/44505* (2013.01); *G02B 27/017* (2013.01); *G06F 8/71* (2013.01)

(58) Field of Classification Search
CPC ............ G06T 1/20; G09G 5/00; G02B 27/01; G02B 27/017; G06F 9/4405; G06F 8/71
See application file for complete search history.

(56) References Cited

U.S. PATENT DOCUMENTS

| 7,467,379 | B2  |   | 12/2008 | Desbiens |                    |
|-----------|-----|---|---------|----------|--------------------|
| 8,650,543 | B1  | * | 2/2014  | Winch    | ........ G06F 9/44505 |
|           |     |   |         |          | 717/120            |
| 2009/0271493 | A1 |   | 10/2009 | Boucard |                  |
| 2012/0254290 | A1 |   | 10/2012 | Naaman  |                  |
| 2012/0304367 | A1 | * | 12/2012 | Howard  | ........ A42B 3/046 |
|           |     |   |         |          | 2/413              |
| 2012/0304767 | A1 | * | 12/2012 | Howard  | ........ A42B 3/046 |
|           |     |   |         |          | 73/504.03          |
| 2014/0065847 | A1 | * | 3/2014  | Salmon  | ........ H04M 1/0256 |
|           |     |   |         |          | 439/39             |
| 2014/0075345 | A1 | * | 3/2014  | Fippel  | ........ G06F 8/34 |
|           |     |   |         |          | 715/762            |
| 2014/0106677 | A1 | * | 4/2014  | Altman  | ........ H04B 1/3827 |
|           |     |   |         |          | 455/41.2           |

(Continued)

Primary Examiner — Maurice L. McDowell, Jr.
Assistant Examiner — Donna J. Ricks
(74) Attorney, Agent, or Firm — Jefferson IP Law, LLP

(57) ABSTRACT

An electronic device is provided. The electronic device includes a management module configured to determine if a package related to an application is equipped in the first electronic device, a communication module configured to receive determine if a package related to an application is equipped in the first electronic device, and a display configured to output an item for executing the application, wherein the management module controls the display to display the item based on a comparison of the package and the application information.

10 Claims, 10 Drawing Sheets

(56) References Cited

U.S. PATENT DOCUMENTS

| | | | |
|---|---|---|---|
| 2014/0363797 A1* | 12/2014 | Hu | G09B 5/02 |
| | | | 434/236 |
| 2014/0375477 A1* | 12/2014 | Jain | H04W 4/046 |
| | | | 340/933 |
| 2015/0009096 A1* | 1/2015 | Lee | G06F 1/163 |
| | | | 345/2.2 |
| 2015/0126117 A1 | 5/2015 | Wong et al. | |
| 2015/0154016 A1* | 6/2015 | Liang | G06F 8/65 |
| | | | 717/169 |
| 2015/0189347 A1 | 7/2015 | Oztaskent et al. | |
| 2015/0340010 A1 | 11/2015 | Travers et al. | |
| 2016/0037345 A1* | 2/2016 | Margadoudakis | H04L 63/0853 |
| | | | 455/411 |
| 2016/0202665 A1 | 7/2016 | Park | |

\* cited by examiner

SYNCHRONIZATION BETWEEN ELECTRONIC DEVICES

CROSS-REFERENCE TO RELATED APPLICATION(S)

This application is a divisional application of prior application Ser. No. 14/628,879, filed on Feb. 23, 2015, and claimed the benefit under 35 U.S.C. § 119(e) of a U.S. Provisional application filed on Feb. 24, 2014 in the U.S. Patent and Trademark Office and assigned Ser. No. 61/943,781, and under 35 U.S.C. § 119(a) of a Korean patent application filed on Jul. 3, 2014 in the Korean Intellectual Property Office and assigned Serial number 10-2014-0083137, the entire disclosure of each of which is hereby incorporated by reference.

TECHNICAL FIELD

The present disclosure relates to a synchronization technique between a host device and an external device connected to the host device.

BACKGROUND

Electronic devices such as smartphones and tablets are now extensively used. Recently, wearable or companion devices, for example, Galaxy Gear, Galaxy Gear 2, Galaxy Gear Fit, or Google Glasses equipped with head mounted display (HMD), are used in conjunction with an electronic device such as a smartphone or a tablet.

Each electronic device may operate separately and may operate in master/slave or provider/consumer relationship. For example, a smartphone (a master or provider device) operating as a host device may have an application package for wearable device (a slave or consumer device). The smartphone may provide the application package to a wearable device through a network (for example, Bluetooth).

For example, a user may connect a smartphone and a smart watch and may then use them together. Applications a, b, and c may be installed on the smart watch and applications (or packages) A, B, and C for supporting the applications a, b, and c may be installed on the smartphone. When a user loses a smartphone and then purchases a new smartphone, if only the packages A and B are installed on the new smartphone, after the new smartphone is connected to an existing a smart watch, a component of the smartphone for operating the application c may not exist. In such a case, a malfunction may occur in application c or a situation in which a smartphone or a smart watch does not operate may occur. Therefore, when a smartphone is newly connected to a smart watch, the smart watch may be factory reset compulsorily. Accordingly, a user experiences unnecessary inconvenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a negative sync that hides a related item or setting menu by mutual exchange of information on the compatibility of mutually connected electronic devices in case that a package, a function, or an application required for the other party device does not exist.

Another aspect of the present disclosure is to provide a positive sync that updates packages, functions, and applications, which are not included in the other device.

In accordance with an aspect of the present disclosure, an electronic device is provided. The electronic device includes a management module configured to determine if a package related to an application is equipped in the first electronic device, a communication module configured to determine if a package related to an application is equipped in the first electronic device, and a display configured to display an item for executing the application, wherein the management module controls the display to display the application based on a comparison of the package and the application information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
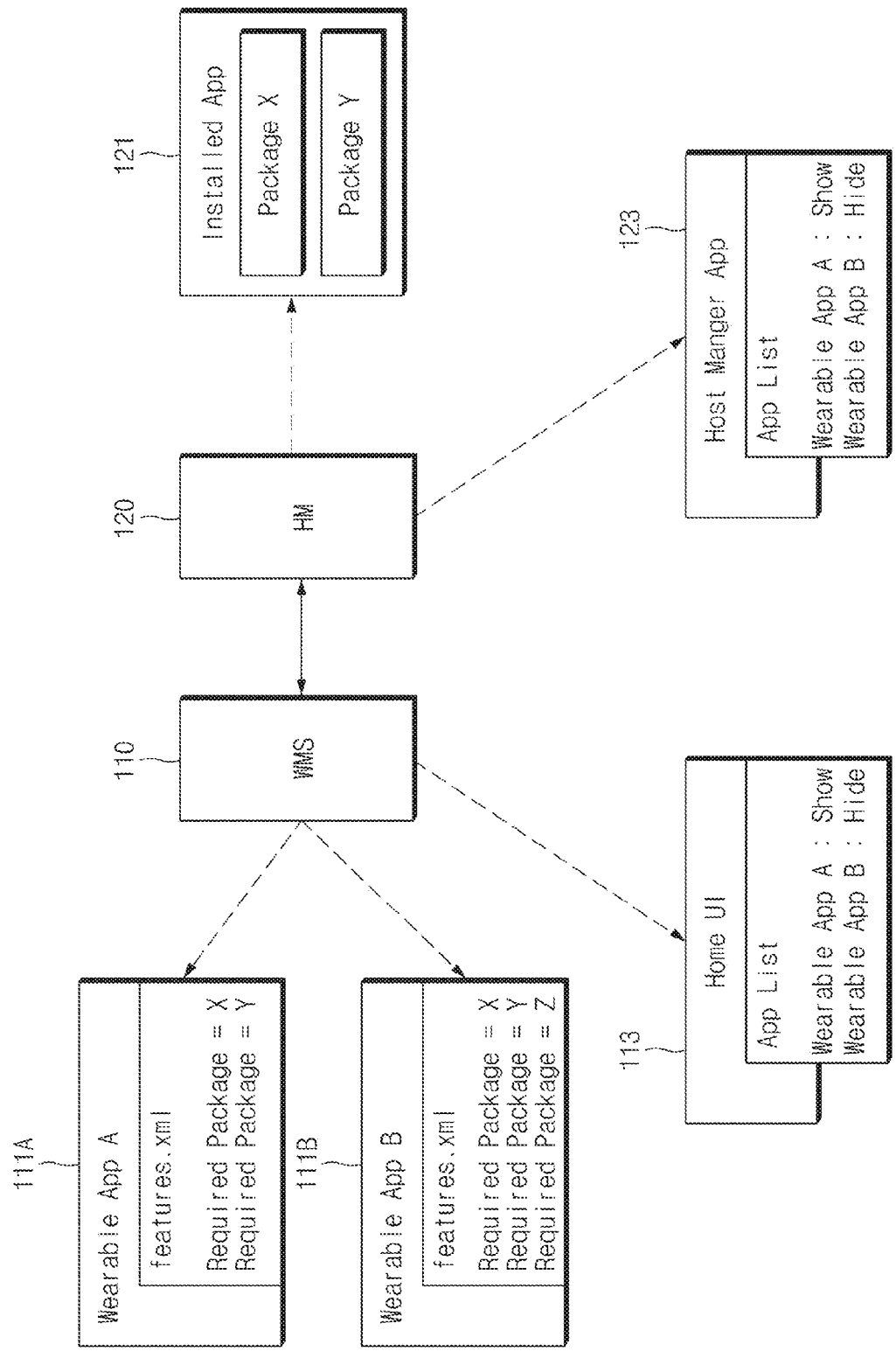
FIG. 1 is a diagram of electronic device synchronization according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements. The meaning of "include," "comprise," "including," or "comprising," specifies a property, a region, a fixed number, a step, a process, an element and/or a component but does not exclude other properties, regions, fixed numbers, steps, processes, elements and/or components. In this specification, the expression "or" includes any or all combinations of words listed. For example, "A or B" may include A or include B or include both A and B.

The terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms used in this specification are used to describe specific embodiments, and are not intended to limit the scope of the present disclosure.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Additionally, an electronic device according to an embodiment of the present disclosure may be a device with a communication function. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia player (PMPs), digital audio players, mobile medical devices, cameras, and wearable devices (e.g., head-mounted-devices (HMDs) such as electronic glasses, electronic apparel, electronic bracelets, electronic necklaces, electronic accessories, electronic tattoos, and smart watches). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

Hereinafter, an electronic device according to various embodiments of the present disclosure will be described in more detail with reference to the accompanying drawings. The term "user" in various embodiments of the present disclosure may refer to a person using an electronic device or a device using an electronic device (for example, an artificial intelligent electronic device).

FIG. 1 is a diagram of electronic device synchronization according to various embodiments of the present disclosure.

Referring to FIG. 1, a plurality of electronic devices may be mutually connected to each other for synchronization of data. The electronic devices may include an arbitrary device operating as a provider/consumer or a master/slave configuration. In various embodiments of the present disclosure, a first device includes a package operating in the first device and a second device, the package provides data of an application to the second device, and a corresponding package is supported by the first device in order to allow the application to operate in the second device.

Hereinafter, for convenience of description, a first electronic device (for example, a provider) may be described as a host device (for example, a smartphone) and a second electronic device may be described as a wearable device. All electronic devices other than host devices may be understood as external devices. However, both the first and second electronic devices could be smartphones. For example, the first electronic device may be a smartphone and the second electronic device may be a tablet.

In various embodiments of the present disclosure, in addition to an application package (for example, an application package where files (*.apk) for smartphone and other files (*.apk) for smart watch are integrated), a package may be understood as the sum of functions/application/hardware/modules for allowing a specific function of a smart watch to operate. For example, although a smartphone and a wearable device for supporting a Bluetooth low energy (BLE) function interoperate with each other, when the smartphone is lost and a new smartphone interoperates with the wearable device again, if the new smartphone does not support the BLE function, a function (or application) relating to the BLE function of the wearable device may not operate normally. In such a case, a negative synchronization according to various embodiments of the present disclosure may be applied. In various embodiments of the present disclosure, the "package" may be appropriately understood as the above-mentioned broad concept.

Referring to FIG. 1 again, a host device (for example, a smartphone) and a wearable device (for example, a smart watch) may be connected to each other. The devices may be connected through short-range communication such as Bluetooth (BT), wireless fidelity (Wi-Fi), Wi-Fi Direct, or a wired connection. A connection and processes occurring during the connection will be described later with reference to FIGS. 2 and 3.

A wearable manager service (WMS) module 110 of a wearable device and a host manager (HM) module 120 of a host device may perform capability exchange. An operation performed by each module will be described.

The WMS module 110 may check information on a list of applications that are installed on a wearable device and a package that each application requires. For example, it is assumed that wearable app A 111A and a wearable app B 111B are installed on a wearable device. Each application may include information on a function of a corresponding application and the information may include information on a required package. For example, the application 111A may require packages X and Y and the application 111B may require packages X, Y, and Z. Such information may be included in a structured document such as, for example, an extensible markup language (xml) document. The WMS module 110 may obtain information on a package that the application requires from the document (for example, features.xml).

The HM module 120 may check a list of installed packages (equipped) in a host device. As shown in an embodiment of the present disclosure, an application 121 including packages X and Y may be installed on a host device. Like the WMS module 110, the HM module 120 may bring or obtain information of the installed package from a structured document including installation information. Additionally, in various embodiments of the present disclosure, the HM module 120 may bring package information from basic information and spec stored in a host device itself.

In various embodiments of the present disclosure, the WMS module 110 and the HM module 120 may perform capability exchange. For example, the WMS module 110 may transmit package information (wearable device) that an application requires through a communication channel formed between a wearable device and a host device and may receive package information installed on a host device. Additionally, the HM module 120 may receive required package information from a wearable device through the communication channel and may transmit installed package information to a wearable device.

In various embodiments of the present disclosure, the WMS module 110 and the HM module 120 may compare its own information and information received from the other party to determine whether to output an item for each application.

For example, a basic user interface (UI) 113 (for example, home UI) may be displayed on a display of a wearable device and icons or a list of applications installed on a wearable device may be displayed on the UI 113. In this case, the WMS module 110 may not output an application when a package required for a normal operation is not supported by the host device.

For example, a host device may provide a HM screen 123 for managing an application installed on a wearable device. When an application, which is not supported by a host device, is installed on a wearable device, the HM module 120 may not output an item of a corresponding application (for example, an unsupported application) to the HM screen 123. Additionally, the HM module 120 may support deleting an application included in a list of unsupported applications, or may perform an operation of changing a setting of a host device to support the application (e.g., the operation might be called as a positive synchronization). A positive synchronization will be described with reference to FIG. 10.

Figure 2:
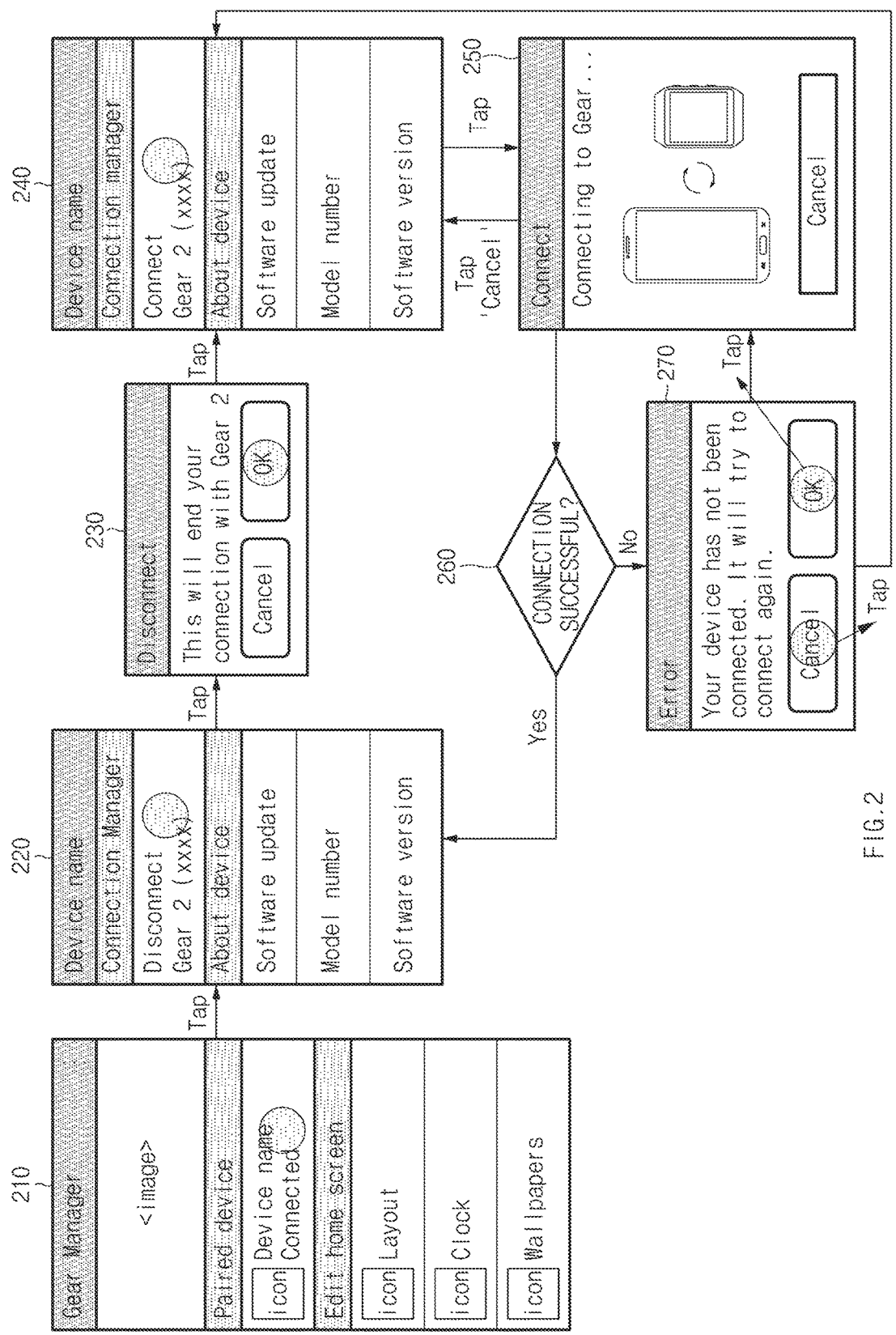
FIG. 2 is a view illustrating a method of connecting and disconnecting an electronic device according to various embodiments of the present disclosure.

FIG. 2 is a view illustrating a method of connecting and disconnecting an electronic device according to various embodiments of the present disclosure.

Referring to FIG. 2, a displayed screen may be understood as a part of an HM screen 123 for controlling several settings of a wearable device via a host device. For example, a screen 210 may represent a start screen (for example, Gear Manager) of a HM. When a paired device is connected to a host device, the screen 210 may include an image representing the connected device, the name of the connected device, and a menu for editing a home screen of the connected device (e.g. Edit home screen). A user may edit the layout, watch configuration, and wallpaper of the connected device in the screen 210.

When a user selects (for example, taps a device name item) a connected device in a screen 210, a sub menu for the selected device may be provided in a screen 220. For example, the screen 220 may provide a menu item for disconnecting a device, a menu item for updating software of a connected device, the model number of a connected device, and the software version of a connected device.

When a user selects a disconnection menu in the screen 220, the disconnection request may be verified in the screen 230. When a user selects an OK button, the host device and the connected device (for example, a wearable device) may be disconnected.

When the connection is disconnected, a screen 240 may provide information on an external device that is connectible to a host device. A host device may provide a list of devices that are detectable or connectable by using short-range communication such as BLE, BT, Wi-Fi, and Wi-Fi Direct, cellular communication such as third generation (3G) and long term evolution (LTE), or wired connection.

When a connection for at least one external device in the list provided in the screen 240 is selected, a screen 250 may be displayed. For example, when, at screen of a smartphone (for example, Galaxy S5), a user selects a connection with a smart watch (for example, Galaxy Gear 2) near the smartphone, a screen representing the attempting of a connection between the smartphone and the smart watch may be outputted. If a user selects a cancel button, the screen 250 returns to the screen 240 and, if not, the screen 250 proceeds to operation 260. Operations performed while the screen 250 is outputted are described with reference to FIG. 3.

When the connection with an external device is successful, the screen 220 may be outputted. In this case, an item included in the screen 220 may be updated as information of a connected device. Additionally, the screen 220 may provide a list of previously connected devices in addition to a currently connected device.

Referring back to operation 260, when the connection with an external device fails, a screen 270 may be outputted. The screen 270 may indicate an error message. When a user selects a reconnection attempt (for example, an OK button), a host device may attempt a connection with the external device again while outputting the screen 250. If a cancel button (for example, cancel) is selected, the screen 240 may be outputted.

As shown in an embodiment of FIG. 2, an item for an application of a connected device may be provided. For example, items or information on applications may be provided in a home screen edit menu (e.g., Edit home screen) of the screen 210 or a device detail menu (e.g., about device) of the screen 220. In this case, when a negative synchronization is applied, applications that are installed on an external device but are determined to not be supported by a host device (i.e., unsupported applications) may not be outputted. In various embodiments of the present disclosure, the unsupported applications may be outputted from an additional menu or screen. By distinguishing and outputting unsupported applications that are installed on an external device in such a way, failures, malfunctions, and device freezing may be prevented.

Figure 3:
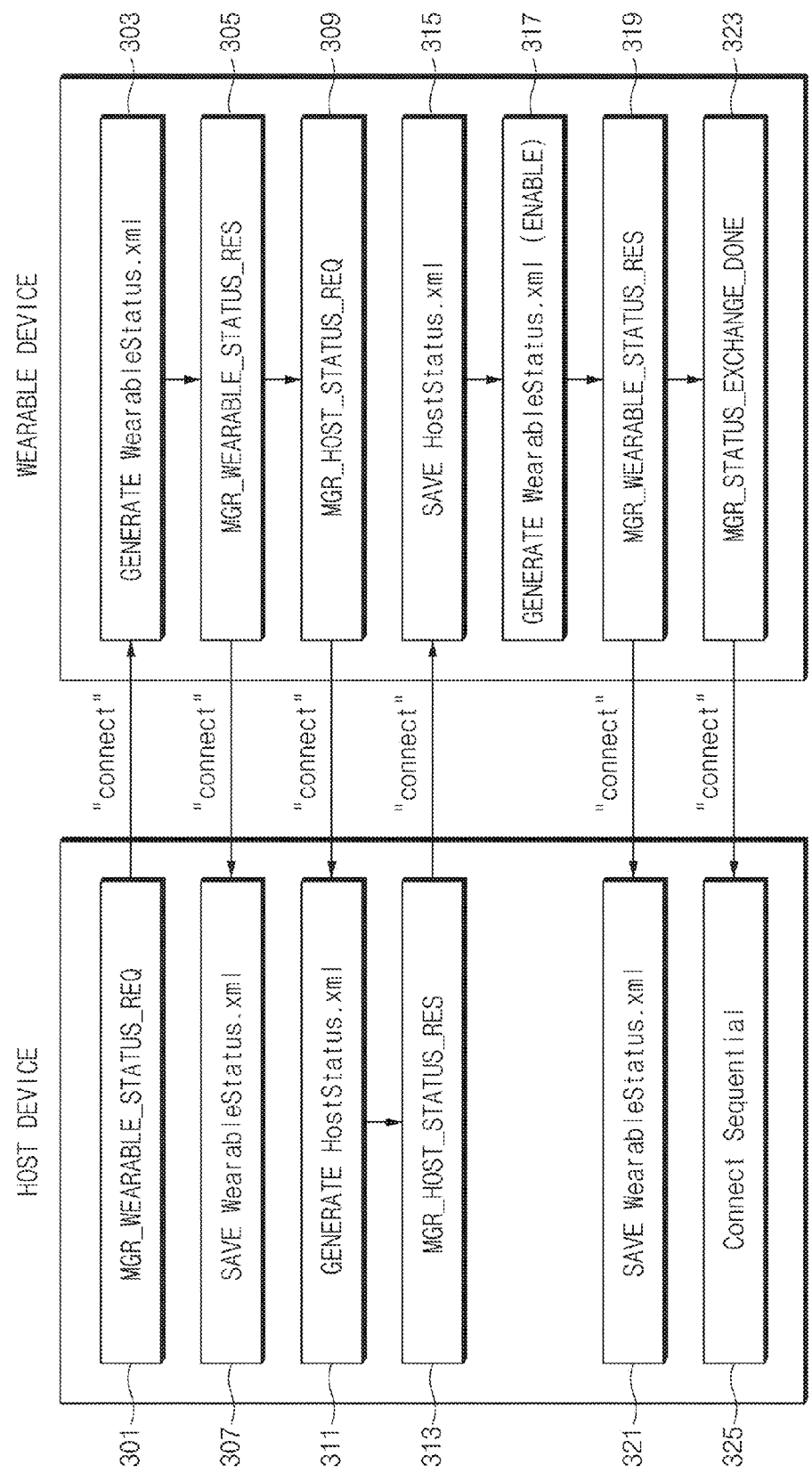
FIG. 3 is a view illustrating a connection and a synchronization order according to various embodiments of the present disclosure.

FIG. 3 is a view illustrating a connection and a synchronization order according to various embodiments of the present disclosure.

Referring to FIG. 3, a host device (for example, an HM or a management module of a host device) may establish a connection with an external device (for example, a wearable device) and may perform synchronization. In operation 301, the host device may request a state of a wearable device (MGR_WEARABLE_STATUS_REQ). On the receipt of the request, the wearable device may generate state information of the wearable device in operation 303. The state information may be generated as a structured document (for example, WearableStatus.xml). In operation 305, the wearable device may transmit a response (MGR_WEARABLE_STATUS_RES) to the host. The host device may store the received state information (for example, WearableStatus.xml).

The wearable device may transmit the response in operation 305 and may then request (MGR_HOST_STATUS_REQ) a state of the host in operation 309. On the receipt of the request, the host device may generate state information of the host device in operation 311. The state information may be generated as a structured document (for example, HostStatus.xml). In operation 313, the host device may transmit a response (MGR_HOST_STATUS_RES) to the wearable device in response to the request of the wearable device. The wearable device may store the received state information in operation 315.

In operation 317, the wearable device may generate function information in the wearable device (e.g., applications/functions of the wearable device). The information may be as a structured document (for example, WearableStatus.xml). This information may be partially different from the information generated in operation 303 and may be distinguished by a different format or name (for example, WearableStatusEnable.xml). Or, a supportable application may be distinguished by using a predetermined tag (for example, <ENABLE APPLICATION> or <ENABLE>) in the document.

In operation 319, the wearable device may transmit a response (MGR_WEARABLE_STATUS_RES) including information on a supportable application again. Additionally, after the transmission in operation 319, the wearable device may transmit a message (MGR_STATUS_EXCHANGE_DONE) that states information exchange (for example, capability exchange) is completed to the host device.

The host device may store the additionally received state information (for example, WearableStatus.xml or WearableStatusEnable.xml) of the wearable device in operation 321. Additionally, the host device may complete a connection establishment in operation 325. When up to operation 325 is completed, for example, the screen 220 shown in FIG. 2 may be outputted again.

In various embodiments of the present disclosure, the external device is not limited to the wearable device. As mentioned above in relation to FIG. 1, a device coupled to the host device and using a function (or package) of the host device may be also included in the external device. For example, when a smartphone and a smartphone, a smartphone and a tablet, and a smartphone and a notebook PC are mutually connected to each other, the above process may be applied (In this case, for example, MGR_WEARABLE_STATUS_REQ may be modified to MGR_TABLET_ STATUS_REQ).

In the above embodiments of the present disclosure, a wearable device generates information (for example, support list information) of applications/functions available and provides the information to the host device (refer to operation 317 to operation 321). In various embodiments of the present disclosure, support list information may be generated by a host device in a corresponding way or may be generated by both a host device and a wearable device and to be exchanged mutually.

Figure 4:
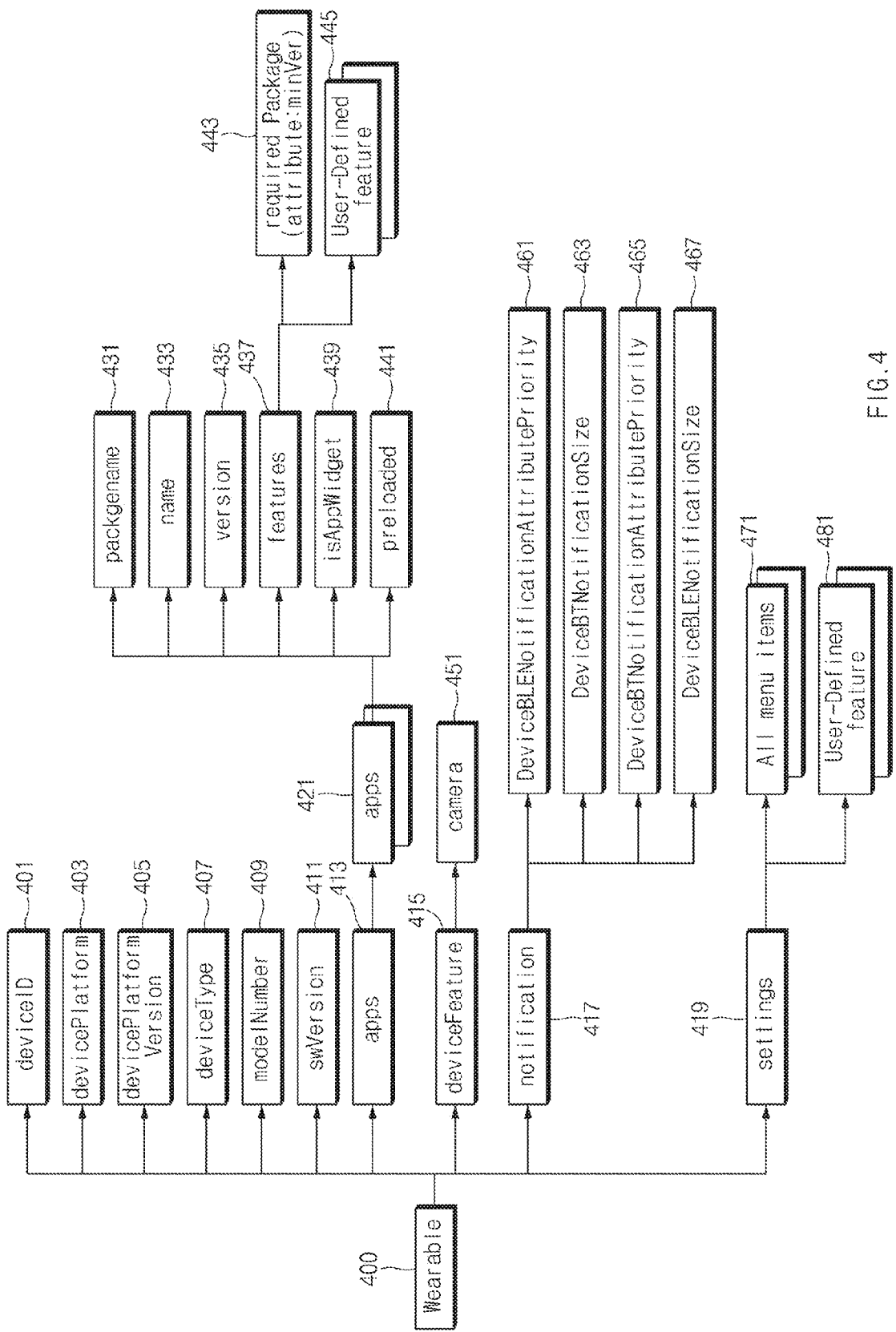
FIG. 4 is a view illustrating a data structure of an external device according to various embodiments of the present disclosure.

FIG. 4 is a view illustrating a data structure of an external device according to various embodiments of the present disclosure.

Referring to FIG. 4, a data structure 400 of a wearable device may include at least one among the items of deviceID 401, devicePlatform 403, devicePlatformVersion 405, deviceType 407, modelNumber 409, swVersion 411, apps 413, deviceFeature 415, notification 417, and settings 419.

The deviceID 401 may be the unique identification (ID) of a wearable device based on a BT/BLE media access control (MAC) address. The devicePlatform 403 may be a platform applied to a device, such as Android or Tizen. The devicePlatformVersion 405 may represent the version (for example, 4.4 or 2.2.0) of the platform. The deviceType 407 may represent the type (for example, Gear, Gear 2, and Gear Fit) of a device. The modelNumber 409 may represent the model number (for example, SM-R380) of a device. The swVersion 411 may represent the software version (for example, R380XXE0ANB6) of a device.

The Apps 413 may represent applications information included in a wearable device. For example, the app 413 may include a plurality of apps 421. Each app 421 may include at least one of packagename 431, name 433, version 435, features 437, isAppWidget 439, and preloaded 441.

In various embodiments of the present disclosure, the packagename 431 may be used as the package name and unique ID of an application package. The unique ID is provided to recognize an application or an application package.

In various embodiments of the present disclosure, the name 433 may represent the name of an application (for example, Find My Wearable). The version 435 may represent the version of an installed application. The isAppWidget 429 may represent whether a corresponding application is an app widget type and the preloaded 441 may represent whether a corresponding application needs to be preloaded to a device.

In various embodiments of the present disclosure, the feature 437 may include a user-defined feature 445 and required package 443 (for example, a namespace such as com.samsung.app.abc). Additionally, the required package 443 may further include the minimum version information (attribute: minVer) required for executing the application.

The deviceFeature 415 may represent a function defined according to each role in a host device and an external device. For example, a wearable device may include a camera function corresponding to the camera 451.

The notification 417 may include priority information of a notification attribute that is set by a device connected through BLE (DeviceBLENotificationAttributePriority 461), the basic size (byte) of a notification set by a device connected through BT (DeviceBTNotificationSize 463), the priority of a notification attribute set by a device connected through BT (DeviceBTNotificationAttributePriority 465), the basic size (byte) of a notification set by a device connected through BLE (DeviceBLENotificationSize 467).

The settings 419 may include a User-Defined feature 481 and all menu items 471.

In various embodiments of the present disclosure, for example, in operation 303 of FIG. 3, a wearable device may generate wearableStatus.xml including at least one of necessary information from the data structure 400 of FIG. 4 and may then transmit the data structure 400 to a host device. For example, the WearableStatus.xml may include the software version (swVersion 411) of a wearable device, an installed app type and version (name 433 and version 435), and required package information (requiredPackage 433).

Figure 5:
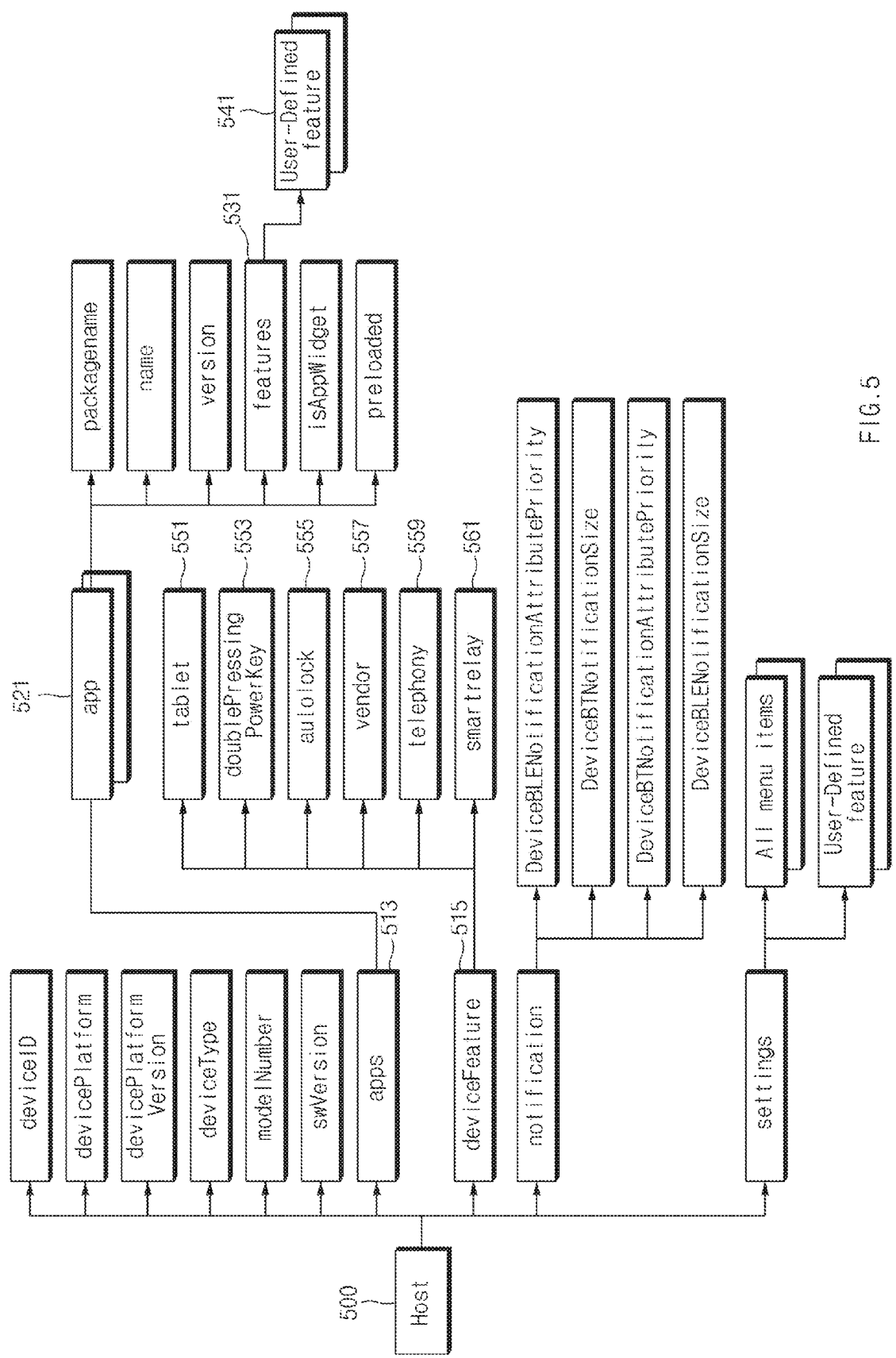
FIG. 5 is a view illustrating a data structure of a host device according to various embodiments of the present disclosure.

FIG. 5 is a view illustrating a data structure of a host device according to various embodiments of the present disclosure.

Referring to FIG. 5, a data structure 500 may be understood as a data structure of a host device connected to the external device of FIG. 4. Among items shown in FIG. 5, similar or corresponding contents described with reference to FIG. 4 are not described.

That is, the data structure 500 of a host device may have a structure similar to the data structure 400 of the external device of FIG. 4. As shown in an embodiment of the present disclosure, apps 513 in the data structure 500 include information on a plurality of apps 521 and each app 521 includes the feature 532 of each application. In this case, since a package installed on a host device is the package itself, required package information (for example, requiredPackage 433) may not be included in a data structure.

Referring to FIG. 5, the data structure 500 of the host device may include deviceFeature 515. In various embodiments of the present disclosure, the deviceFeature 515 may include information (e.g., tablet 551) representing whether the host device is a tablet, whether to support auto lock (e.g., autolock 555), manufacturer information (e.g., vendor 557), whether to support a call (e.g., telephony 559), and whether to support hardware smart relay (e.g., smartrelay 561). In various embodiments, some items of the deviceFeature 515 shown in FIG. 5 may be included in the deviceFeature 415 of FIG. 4 or vice versa.

In various embodiments of the present disclosure, referring to FIGS. 3 to 5 again, a host device may generate (or extract) HostStatus.xml including at least the packagename information on the app 521 or the deviceFeature 515 and may then transmit the information to a wearable device. In operation 317, the wearable device may compare package or function information in the received HostStatus to a package (requiredPackage 443) or a function (for example, camera 451) required for the wearable device. The wearable device may generate information, which indicates that a normal operation is possible, in a data structure format and may than transmit the generated information to the host device again.

In various embodiments of the present disclosure, a corresponding operation may be performed based on the host device. For example, the wearable device may transmit installed application information to the host device. The information may include required package information and/or the minimum version information of the package. The host device may compare the received information and the data structure 500 and may decide not to output an application on an HM screen (for example, screen 123 if the application will not execute normally in the wearable device.

Figure 6:
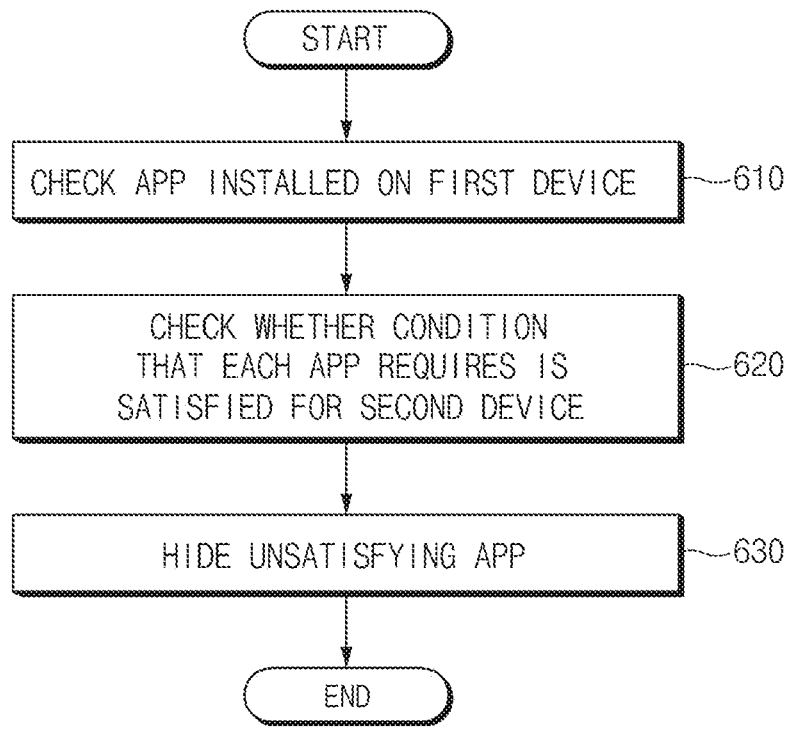
FIG. 6 is a view illustrating a process of negative sync according to various embodiments of the present disclosure.

FIG. 6 is a view illustrating a process of negative sync according to various embodiments of the present disclosure.

For convenience, overlapping content and corresponding contents may not be described and it is presumed that a first device is an external device and a second device is a host device is described with reference to FIG. 6. First, the first device is described.

In operation 610, the first device may determine if an application is installed on the first device. For example, the first device may extract data or obtain information on the application, for example, information included in a corresponding item from the above-mentioned data structure of the information.

In operation 620, the first device may check whether a condition that each application requires is satisfied for the second device. For example, the first device may receive package information installed on the second device and may compare the received information with installed application information of applications installed on the first device.

In operation 630, when a required application is not installed on the first device, the first device may hide a corresponding app from a display (e.g., UI) to prevent operational issues with the second device.

In various embodiments of the present disclosure, the first device may transmit a comparison result to the second device. The comparison result may include a list of supportable applications (or a list of unsupportable applications) from the installed applications of the first device. The second device may set an item that is to be or not to be outputted from the first device on the basis of the comparison result. The first device may output an item (for example, an icon and a menu) of an application according to an item set by the second device.

In various embodiments of the present disclosure, the first device itself may not output an item of a corresponding application according to the comparison result. However, in this case, the first device may transmit a comparison result to the second device for output processing on an application that the first device does not support in a management screen of the second device.

The second device (that is, a host device) is described. In operation 610, the second device may determine if an application is installed on the first device. For example, the second device may receive application information of installed applications on the first device.

In operation 620, the second device may check whether an application installed on the first device is supported by the second device. In operation 620, the second device may determine whether a package, a function, and hardware installed on the second device supports the applications of the first device based on information included in the data structure (for example, the data structure 500) of the second device. As another method, the second device may transmit package or function information to the first device and may then receive supported application information from the first device.

In operation 630, when an application installed on the second device is not yet supported by the first device, the second device and/or the first device may not display the unsupported application. For example, the second device may transmit a control command for not outputting an unsupported application on the display of the first device. Additionally, the second device may not output the unsupported application or may separately output it as an additional item on the HM screen of the second device.

In various embodiments of the present disclosure, a synchronization method of an electronic device may include determining if an application is installed in the first device, determining if a requirement of the application is satisfied by the second device, and determining whether to output the application from the first device or the second device based on the determination result.

Herein, the checking of whether the condition is satisfied may include determining whether a required package of the application is installed on the second device.

Additionally, the method may further include transmitting information on a package installed on the second device to the first device and receiving information on an application operable on the first device generated based on information on the installed package. Herein, the checking of whether the condition is satisfied may further include performing a determination on the basis of the information on an operable application.

In various embodiments of the present disclosure, the determining of whether to output the portion of the application may further include, when it is determined that the condition is not satisfied on the basis of the check result, restricting an output of an unsatisfied application item on the display of the first device or the second device.

Figure 7:
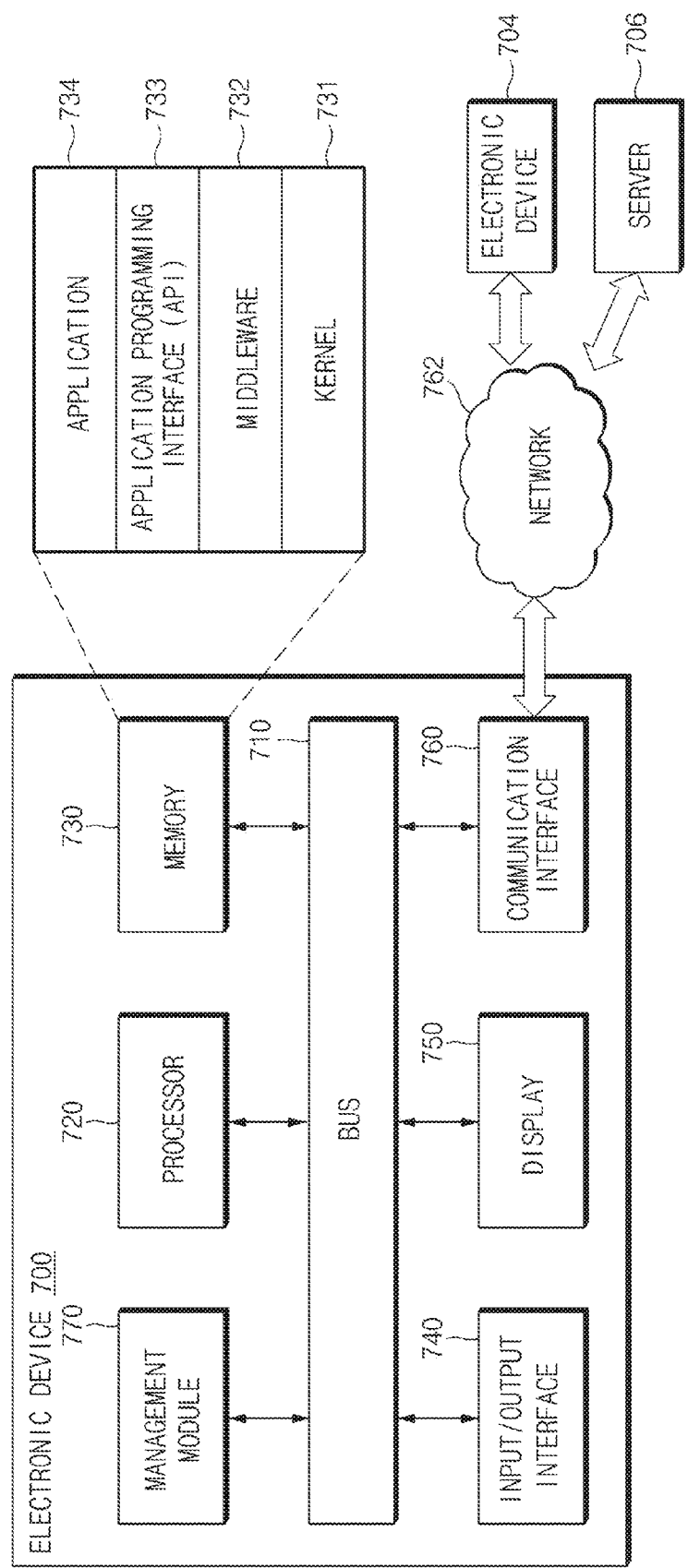
FIG. 7 is a block diagram illustrating a network environment including an electronic device according to various embodiments of the present disclosure.

FIG. 7 is a block diagram illustrating a network including an electronic device according to various embodiments of the present disclosure.

Referring to FIG. 7, the electronic device 700 may include a bus 710, a processor 720, a memory 730, an input/output interface 740, a display 750, a communication interface 760, and a management module 770. The electronic device 700 may be a host device and the electronic device 704 may be an external device (for example, a wearable device).

The bus 710 may be a circuit connecting the above-mentioned components to each other and delivering a communication signal (for example, a control message) therebetween.

The processor 720, for example, receives an instruction from the components (for example, the memory 730, the input/output interface 740, the display 750, the communication interface 760, or the management module 770) through the bus 710, interprets the received instruction, and performs operations and data processing in response to the instruction.

The memory 730 may store an instruction or data received from the processor 720 or other components (for example, the input/output interface 740, the display 750, the communication interface 760, or the management module 770) or an instruction or data generated from the processor 720 or other components. The memory 730, for example, may include programming modules such as, for example, a kernel 731, a middleware 732, an application programming interface (API) 733, and an application 734. Each of the above-mentioned programming modules may be configured with software, firmware, hardware, or a combination thereof.

The kernel 731 may control or manage system resources (for example, the bus 710, the processor 732, or the memory 733) used for performing operation or functions implemented by other programming modules, for example, the middleware 734, the API 720, or the application 730. Additionally, the kernel 731 may provide an interface for accessing an individual component of the electronic device 700 from the middleware 732, the API 733, or the application 734 and controlling or managing the component.

The middleware 732 may exchange data between the API 733 or the application 734 and the kernel 731. Additionally, in relation to job requests received from the applications 732, the middleware 732 may perform a control (for example, scheduling or load balancing) for the job requests by using a method of assigning a priority for using a system resource (for example, the bus 700, the processor 720, or the memory 730) of the electronic device 700 to at least one application among the applications 734.

The API 733, which is used via the application 734, controls a function provided by the kernel 731 or the middleware 732, may include at least one interface or function (for example, an instruction) for file control, window control, image processing, or character control.

According to various embodiments of the present disclosure, the application 734 may include an Short Message Service (SMS)/Multimedia Messaging Service (MMS) application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 734 may be an application relating to information exchange between the electronic device 700 and an external electronic device (for example, the electronic device 704). The application relating to information exchange, for example, may include a notification relay application for delivering specific information to the external electronic device or a device management application for managing the external electronic device.

For example, the notification relay application may have a function for delivering, to an external electronic device (for example, the electronic device 704), notification information occurring from another application (for example, an SMS/MMS application, an e-mail application, a health care application, or an environmental information application). Additionally or alternatively, the notification relay application may receive notification information from an external electronic device (for example, the electronic device 704) and may then provide the received notification information to a user. The device management application, for example, may manage (for example, install, delete, or update) a function (for example, turning on/off an external electronic device itself (or some components) or adjusting the brightness (or resolution) of a display) for at least part of an external electronic device (for example, the electronic device 700) communicating with the electronic device 704, an application operating in the external electronic device, or a service (for example, a call service or a message service) provided from the external electronic device.

According to various embodiments of the present disclosure, the application 734 may include an application specified according to the attribute (for example, a type of an electronic device) of the external electronic device (for example, the electronic device 704). For example, when an external electronic device is an MP3 player, the application 734 may include an application relating to music playback. Similarly, when an external electronic device is a mobile medical device, the application 734 may include an application relating to heath care. According to an embodiment of the present disclosure, the application 734 may include at least one of an application specified to the electronic device 700 or an application received from an external electronic device (for example, the server 706 or the electronic device 704).

The input/output interface 740 may deliver an instruction or data inputted from a user through an input/output device (for example, a sensor, a keyboard, or a touch screen), to the processor 720, the memory 730, the communication interface 760, or the management module 770 through the bus 710. For example, the input/output interface 740 may provide data on a user's touch inputted through a touch screen to the processor 720. Additionally, the input/output interface 740 may output an instruction or data received from the processor 720, the memory 730, the communication interface 760, or the management module 770 through the bus 710, through the input/output device (for example, a speaker or a display). For example, the input/output interface 740 may output voice data processed through the processor 720 to a user through a speaker.

The display 750 may display various information (for example, multimedia data or text data) to a user. For example, the display 750 may output an HM screen for managing installed applications and applications installed on the electronic device 704.

The communication interface 760 may enable communication between the electronic device 700 and an external device (for example, the electronic device 704 or the server 706). For example, the communication interface 760 may communicate with the external device in connection to the network 762 through wireless communication or wired communication. The wireless communication may include at least one of Wi-Fi, BT, near field communication (NFC), global positioning system (GPS), or cellular communication (for example, LTE, LTE-advanced (LTE-A), code division multiple access (CDMA), wideband CDMA (WCDMA), universal mobile telephone system (UMTS), wireless broadband (WiBro), or global system for mobile communications (GSM)). The wired communication may include at least one of universal serial bus (USB), high definition multimedia interface (HDMI), recommended standard 232 (RS-232), or plain old telephone service (POTS), for example.

According to an embodiment of the present disclosure, the network 762 may be telecommunications network. The telecommunications network may include at least one of computer network, internet, internet of things, or telephone network. According to an embodiment of the present disclosure, a protocol (for example, transport layer protocol, data link layer protocol, or physical layer protocol) for communication between the electronic device 700 and an external device may be supported by at least one of the application 734, the API 733, the middleware 732, the kernel 731, or the communication interface 760.

The management module 770 may process at least part of information obtained from other components (for example, the processor 720, the memory 730, the input/output interface 740, or the communication interface 760) and may output the processed information to a user through various methods. For example, the management module 770 may correspond to the HM module 120 or the WMS module 110 (for example, in the case of the electronic device 704). The management module 770 may compare installation information of applications or packages installed on the electronic device 700 and the electronic device 704 so as to determine whether to output contents on specific application to the display 750 or a display (not shown) of the electronic device 704.

Figure 8:
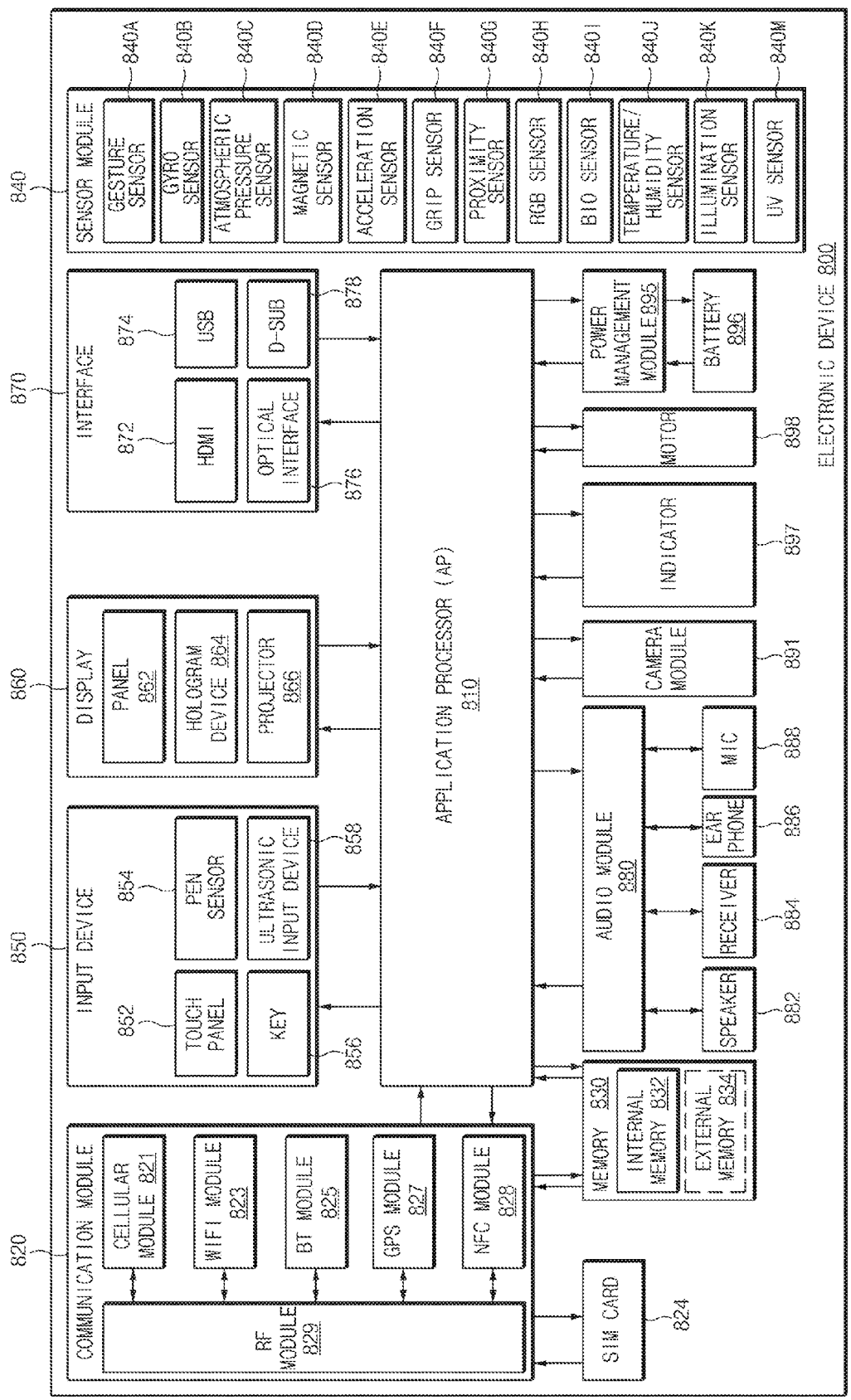
FIG. 8 is a block diagram illustrating hardware of an electronic device according to various embodiments of the present disclosure.

FIG. 8 is a block diagram illustrating hardware of an electronic device according to various embodiments of the present disclosure.

The electronic device 800, for example, may configure all or part of the above-mentioned electronic device 700 shown in FIG. 7. Referring to FIG. 8, the electronic device 800 includes at least one application processor (AP) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may control a plurality of hardware or software components connected to the AP 810 and also may perform various data processing and operations with multimedia data by executing an operating system or an application program. The AP 810 may be implemented with a system on chip (SoC), for example. According to an embodiment of the present disclosure, the AP 810 may further include a graphic processing unit (GPU) (not shown).

The communication module 820 (for example, the communication interface 760) may perform data transmission through a communication between other electronic devices (for example, the electronic device 704 or the server 706) connected to the electronic device 800 (for example, the electronic devices 700) via a network. According to an embodiment of the present disclosure, the communication module 820 may include a cellular module 821, a Wi-Fi module 823, a BT module 825, a GPS module 827, an NFC module 828, and a radio frequency (RF) module 829.

The cellular module 821 may provide voice calls, video calls, text services, or internet services through a communication network (for example, LTE, LTE-A, CDMA, WCDMA, UMTS, WiBro, or GSM). The cellular module 821 may perform a authentication operation on an electronic device in a communication network by using a SIM (for example, the SIM card 824), for example. According to an embodiment of the present disclosure, the cellular module 821 may perform at least part of a function that the AP 810 provides. For example, the cellular module 821 may perform at least part of a multimedia control function.

According to an embodiment of the present disclosure, the cellular module 821 may further include a communication processor (CP). Additionally, the cellular module 821 may be implemented with SoC, for example. As shown in FIG. 8, components such as the cellular module 821 (for example, a CP), the memory 830, or the power management module 895 are separated from the AP 810, but according to an embodiment of the present disclosure, the AP 810 may be implemented including some of the above-mentioned components (for example, the cellular module 821).

According to an embodiment of the present disclosure, the AP 810 or the cellular module 821 (for example, a CP) may load instructions or data, which are received from a nonvolatile memory or at least one of other components connected thereto, into a volatile memory and then may process the instructions or data. Furthermore, the AP 810 or the cellular module 821 may store data received from or generated by at least one of other components in a nonvolatile memory.

Each of the Wi-Fi module 823, the BT module 825, the GPS module 827, and the NFC module 828 may include a processor for processing data transmitted/received through a corresponding module. Although the cellular module 821, the Wi-Fi module 823, the BT module 825, the GPS module 827, and the NFC module 828 are shown as separate blocks in FIG. 8, according to an embodiment of the present disclosure, some (for example, at least two) of the cellular module 821, the Wi-Fi module 823, the BT module 825, the GPS module 827, and the NFC module 828 may be included in one integrated chip (IC) or an IC package. For example, at least some (for example, a CP corresponding to the cellular module 821 and a Wi-Fi processor corresponding to the Wi-Fi module 823) of the cellular module 825, the Wi-Fi module 827, the BT module 828, the GPS module 821, and the NFC module 823 may be implemented with a single SoC.

The RF module 829 may be responsible for data transmission, for example, the transmission of an RF signal. Although not shown in the drawings, the RF module 829 may include a transceiver, a power amp module (PAM), a frequency filter, or a low noise amplifier (LNA). Additionally, the RF module 829 may further include components for transmitting/receiving electromagnetic waves in a free space as a wireless communication, for example, conductors or conducting wires. Although the cellular module 821, the Wi-Fi module 823, the BT module 825, the GPS module 827, and the NFC module 828 share one RF module 829 shown in FIG. 8, according to an embodiment of the present disclosure, at least one of the cellular module 821, the Wi-Fi module 823, the BT module 825, the GPS module 827, and the NFC module 828 may perform the transmission of an RF signal through an additional RF module.

The SIM card 824 may be inserted into a slot formed at a specific position of an electronic device. The SIM card 824 may include unique identification information (for example, an integrated circuit card identifier (ICCID)) or subscriber information (for example, an international mobile subscriber identity (IMSI)).

The memory 830 (for example, the memory 730) may include an internal memory 832 or an external memory 834. The internal memory 832 may include at least one of a volatile memory (for example, dynamic random access memory (DRAM), static RAM (SRAM), synchronous dynamic RAM (SDRAM)) and a non-volatile memory (for example, one time programmable read only memory (OTPROM), programmable ROM (PROM), erasable and programmable ROM (EPROM), electrically erasable and programmable ROM (EEPROM), mask ROM, flash ROM, Not AND (NAND) flash memory, and Not OR (NOR) flash memory).

According to an embodiment of the present disclosure, the internal memory 832 may be a Solid State Drive (SSD). The external memory 834 may further include flash drive, for example, compact flash (CF), secure digital (SD), Micro-SD, Mini-SD, extreme digital (xD), or a memory stick. The external memory 834 may be functionally connected to the electronic device 800 through various interfaces. According to an embodiment of the present disclosure, the electronic device 800 may further include a storage device (or a storage medium) such as a hard drive.

The sensor module 840 measures physical quantities or detects an operating state of the electronic device 800, thereby converting the measured or detected information into electrical signals. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (for example, a red, green, blue (RGB) sensor), a bio sensor 840I, a temperature/humidity sensor 840J, an illumination sensor 840K, and an ultra violet (UV) sensor 840M. Additionally/alternately, the sensor module 840 may include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 840 may further include a control circuit for controlling at least one sensor therein.

The input module 850 may include a touch panel 852, a (digital) pen sensor 854, a key 856, or an ultrasonic input device 858. The touch panel 852 may recognize a touch input through at least one of capacitive, resistive, infrared, or ultrasonic methods, for example. Additionally, the touch panel 852 may further include a control circuit. In the case of the capacitive method, both direct touch and proximity recognition are possible. The touch panel 852 may further include a tactile layer. In this case, the touch panel 852 may provide a tactile response to a user.

The (digital) pen sensor 854 may be implemented through a method similar or identical to that of receiving a user's touch input or an additional sheet for recognition. The key 856 may include a physical button, a touch key, an optical key, or a keypad, for example. The ultrasonic input device 858, as a device checking data by detecting sound waves through a mic (for example, the mic 888) in the electronic device 800, may provide wireless recognition through an input tool generating ultrasonic signals. According to an embodiment of the present disclosure, the electronic device 800 may receive a user input from an external device (for example, a computer or a server) connected to the electronic device 200 through the communication module 820.

The display 860 (for example, the display 750) may include a panel 862, a hologram device 864, or a projector 866. The panel 862, for example, may include a liquid-crystal display (LCD) or an active-matrix organic light-emitting diode (AM-OLED). The panel 862 may be implemented to be flexible, transparent, or wearable, for example. The panel 862 and the touch panel 852 may be configured with one module. The hologram 864 may show three-dimensional images in the air by using the interference of light. The projector 866 may display an image by projecting light on a screen. The screen, for example, may be placed inside or outside the electronic device 800. According to an embodiment of the present disclosure, the display 860 may further include a control circuit for controlling the panel 862, the hologram device 864, or the projector 866.

The interface 870 may include an HDMI 872, a USB 874, an optical interface 876, or a D-subminiature (D-sub) 878, for example. The interface 870 may be included in the communication interface 760 shown in FIG. 7, for example. Additionally/alternately, the interface 870 may include a mobile high-definition link (MHL) interface, an SD card/multi-media card (MMC) interface, or an infrared data association (IrDA) standard interface.

The audio module 880 may convert sound into electrical signals and convert electrical signals into sounds. At least some components of the audio module 880 may be included in the input/output interface 740 shown in FIG. 7, for example. The audio module 880 may process sound information inputted/outputted through a speaker 882, a receiver 884, an earphone 886, or a mic 888.

The camera module 891, captures a still image and a video, may include at least one image sensor (for example, a front sensor or a rear sensor), a lens (not shown), an image signal processor (ISP) (not shown), or a flash (not shown) (for example, an LED or a xenon lamp).

The power management module 895 may manage the power of the electronic device 800. Although not shown in the drawings, the power management module 895 may include a power management IC (PMIC), a charger IC, or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 896, or a voltage, current, or temperature of the battery 896 during charging. The battery 896 may store or generate electricity and may supply power to the electronic device 800 by using the stored or generated electricity. The battery 896, for example, may include a rechargeable battery or a solar battery.

The indicator 897 may display a specific state of the electronic device 800 or part thereof (for example, the AP 810), for example, a booting state, a message state, or a charging state. The motor 898 may convert electrical signals into mechanical vibration. Although not shown in the drawings, the electronic device 800 may include a processing device (for example, a GPU) for mobile television (TV) support. A processing device for mobile TV support may process media data according to the standards such as digital multimedia broadcasting (DMB), digital video broadcasting (DVB), or media flow.

Each of the above-mentioned components of the electronic device according to various embodiments of the present disclosure may be configured with at least one component and the name of a corresponding component may vary according to the kind of an electronic device. An electronic device according to an embodiment of the present disclosure may be configured including at least one of the above-mentioned components or additional other components. Additionally, some of components in an electronic device according to an embodiment of the present disclosure are configured as one entity, so that functions of previous corresponding components are performed.

According to various embodiments of the present disclosure, update processing between a host device (for example, an electronic device, and a mobile terminal) and an external device (for example, a wearable device, a smart watch, a galaxy gear, and sub device) may be performed.

For example, a host device forms a communication channel with an external device, receives setting information (capability) of an external device, and checks the setting information version of an external device.

When the setting information version of an external device supports a function identical to a corresponding function and is different from a function and version installed on the host device, the host device may output an update message. Herein, the update message may include a message indicated that version information is different and a message (a pop-up window including a virtual button representing confirm or cancel relating to version update) requesting update according to version information difference. The message relating to the update may be outputted from at least one of a host device and an external device.

According to various embodiments of the present disclosure, in relation to the update, a host device may correct corresponding data and may then provide it to an external device. In relation to this, a host device may store a specific integrated package (that is a package including basic data installed on the host device and sub data installed on the external device, as data prepared to perform the same or similar function in the host device and the external device) in a storage module or may receive the specific integrated package from a server device providing a corresponding package. Accordingly, the host device may provide data of a higher version to the external device.

According to various embodiments of the present disclosure, when an external device includes data of a higher version as compared to a host device, the host device may receive a package corresponding to a corresponding version from a server device and may install a program according to installation information included in the package.

According to various embodiments of the present disclosure, a host device and an external device may support downgrade in addition to update. For example, when the version of data in a package prepared in a host device is lower than the version of data in a program installed on an external device, the host device may transmit data of the lower version to an external device. Then, the external device may downgrade the higher version to a lower version provided from the host device. In relation to this, at least one of the host device and the external device may support a guide message for downgrade and a guide information output relating to installation.

According to various embodiments of the present disclosure, an electronic device may include a management module for checking a package equipped in the electronic device, a communication module for receiving information on an application operable on the external device from the external device, and a display for outputting an item on an application installed on the external device. Herein, the management module may determine whether to output an item on each application on the basis of a comparison result of the checked package and the information.

According to various embodiments of the present disclosure, the electronic device may be a host device and the external device may be a wearable device paired with the electronic device.

In various embodiments of the present disclosure, the communication module may transmit information on the package to the external device and the comparison result may be generated on the basis of information on the package transmitted from the external device.

In various embodiments of the present disclosure, the information may include information on a package that the application requires and minimum version information on the package.

In various embodiments of the present disclosure, the management module may be set to determine whether to output the item when the electronic device is connected to the external device.

In various embodiments of the present disclosure, the control module may allow the communication module to transmit the information on an equipped package to perform synchronization in the external device.

According to various embodiments of the present disclosure, an electronic device may include a management module for checking the requirements of an application installed on the electronic device, a communication module for receiving information on a function that the host device supports, and a display for outputting an item on the installed application. Herein, the management module may be set to determine whether to output an item on each application by comparing information on a function that the host device supports and the requirements of the application.

According to various embodiments of the present disclosure, the electronic device may be a wearable device that is coupled to the host device.

In various embodiments of the present disclosure, the requirements of the application may include at least one of a package and a function, which are required for executing the application.

In various embodiments of the present disclosure, when it is determined that the application is not supported by the host device, the management module may determine not to output the application to the UI of the display.

In various embodiments of the present disclosure, the management module may check the requirements from the data structure of the electronic device and the data structure may be set to include package information that each application requires and the minimum version information of each package.

In various embodiments of the present disclosure, the communication module may be set to transmit information in data structure document format on the comparison result to the host device.

Figure 9:
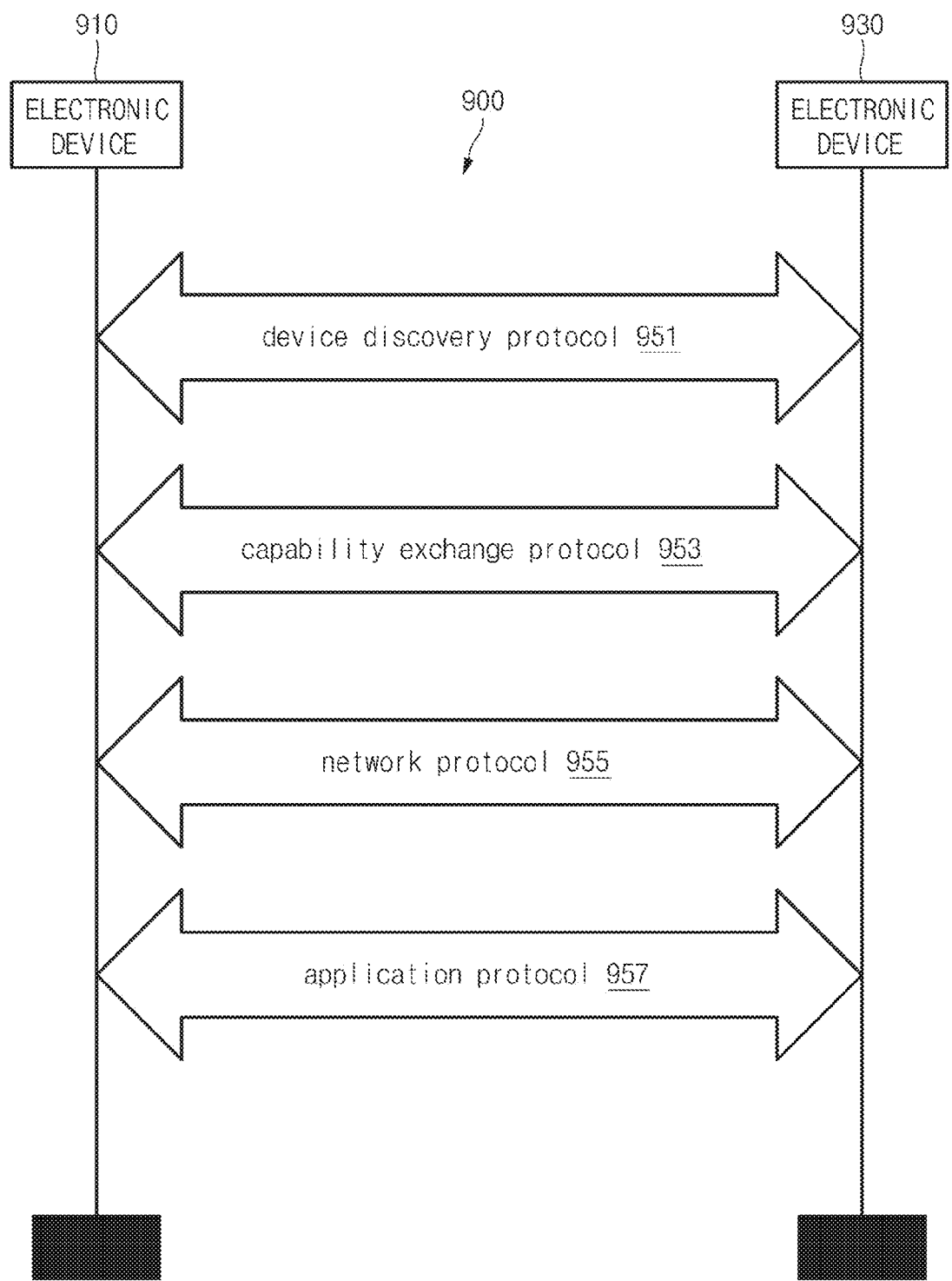
FIG. 9 is a view illustrating a communication protocol among a plurality of electronic devices according to various embodiments of the present disclosure.

FIG. 9 is a view illustrating a communication protocol among a plurality of electronic devices according to various embodiments of the present disclosure.

Referring to FIG. 9, for example, the communication protocol 900 may include a device discovery protocol 951, a capability exchange protocol 953, a network protocol 955, and an application protocol 957.

According to an embodiment of the present disclosure, the device discovery protocol 951 may be used for allowing electronic devices (for example, the electronic device 910 or the electronic device 930) to detect a communicable external electronic device or connect to the detected external electronic device. For example, the electronic device 910 (for example, the electronic device 700) may detect the electronic device 930 (for example, the electronic device 704) as a device communicable with the electronic device 910 by using the device discovery protocol 951 through a communication method (for example, Wi-Fi, BT, or USB). The electronic device 910 may obtain and store identification information on the detected electronic device 930 by using the device discovery protocol 941. The electronic device 910, for example, may establish a communication connection with the electronic device 930 on the basis of at least the identification information.

According to an embodiment of the present disclosure, the device discovery protocol 951 may be a protocol for mutual authentication between a plurality of electronic devices. For example, the electronic device 910 may perform an authentication between the electronic device 910 and the electronic device 930 on the basis of communication information (for example, MAC address, universally unique identifier (UUID), subsystem identification (SSID), and internet protocol (IP) address) for a connection with at least the electronic device 930.

According to an embodiment of the present disclosure, the function exchange protocol 953 may be a protocol for exchanging information relating to a function of a service supported by at least one of the electronic device 910 and the electronic device 930. For example, the electronic device 910 and the electronic device 930 may exchange information relating to a service that each provides through the function exchange protocol 953. Exchangeable information may include information indicating a specific service supported by the electronic device 910 and the electronic device 930. For example, the electronic device 910 may receive identification information on a specific service that the electronic device 930 provides from the electronic device 930 through the function exchange protocol 953. In this case, the electronic device 910 may determine whether the electronic device 910 supports the specific service.

According to an embodiment of the present disclosure, the network protocol 955 may be a protocol used for controlling the flow of data transmitted/received to interoperate with a service and provide the service between electronic devices (for example, the electronic device 910 and the electronic device 930). For example, at least one of the electronic device 910 and the electronic device 930 may perform error control or data quality control by using the network protocol 955. Additionally or alternatively, the network protocol 955 may determine the transmission format of data transmitted/received between the electronic device 910 and the electronic device 930. Additionally, at least one of the electronic device 910 and the electronic device 930 may manage (for example, session connection or session termination) at least a session for data exchange mutually by using the network protocol 955.

According to an embodiment of the present disclosure, the application protocol 957 may be a protocol for providing a procedure or information to exchange data relating to a service provided to an external device. For example, the electronic device 910 (for example, the electronic device 700) may provide service to the electronic device 930 (for example, the electronic device 704 or the server 706) through the application protocol 957.

According to an embodiment of the present disclosure, the communication protocol 900 may include a standard communication protocol, a communication protocol (for example, a communication protocol specified for a communication device manufacturer company itself or a network supply company itself) specified by an individual or organization, or a combination thereof.

Figure 10:
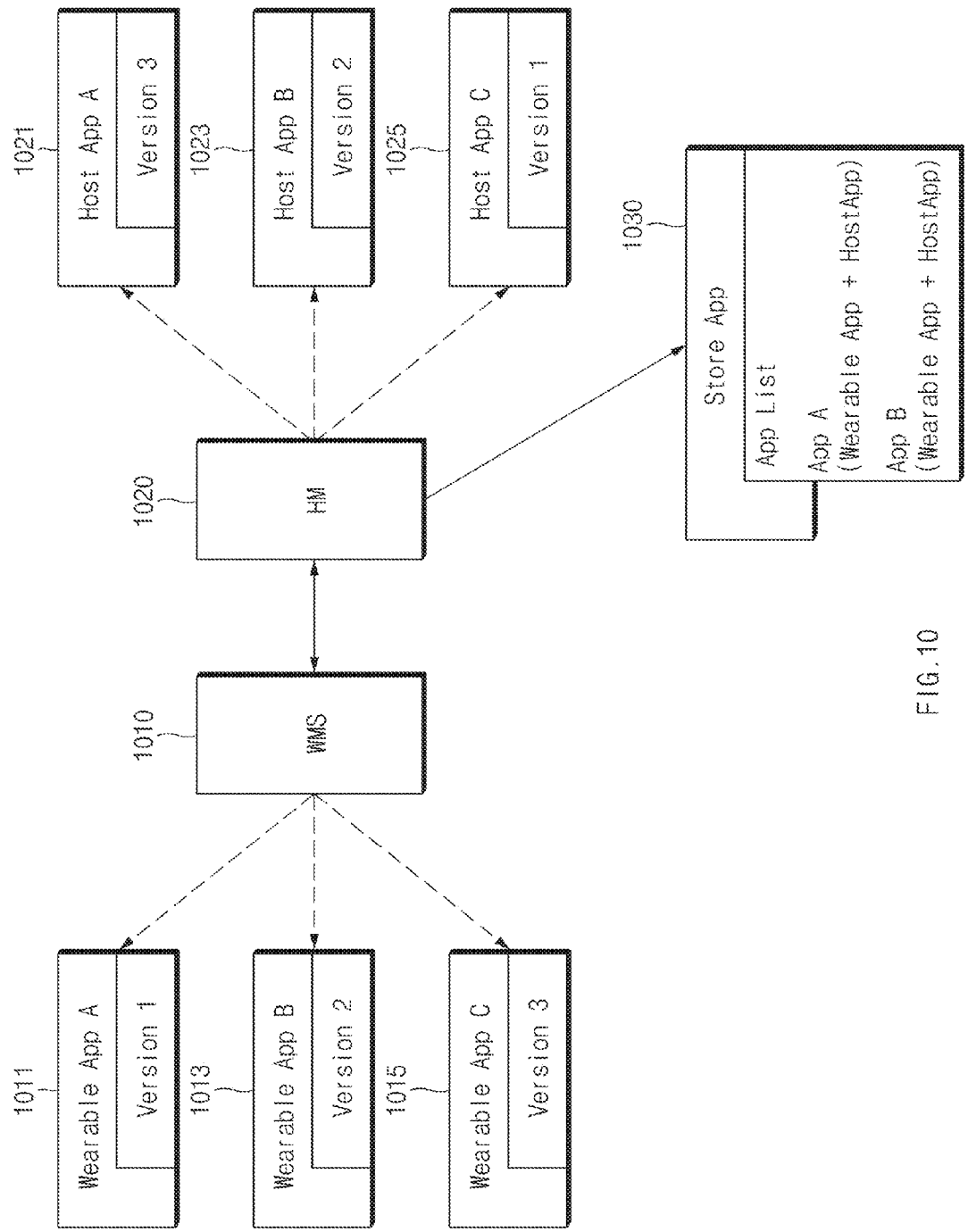
FIG. 10 is a view illustrating positive synchronization according to various embodiments of the present disclosure.

FIG. 10 is a view illustrating positive synchronization according to various embodiments of the present disclosure.

Referring to FIG. 10, a wearable device may include a WMS module 1010 and a host device may include an HM module 1020. The modules 1010 or 1020 may be understood as one example of the management module 770.

In various embodiments of the present disclosure, wearable applications 1011, 1013, and 1015 may be installed on a wearable device. Host applications (packages) 1021, 1023, and 1025 may be installed on a host device.

The module 1010 and the module 1020 may exchange information on an application/package installed in each device as described above with reference to FIGS. 1 to 6.

As illustrated in FIG. 10, application 1011 (Wearable App A) may be 1 and the version of corresponding application 1021 (Host App A) may be 3. In this case, since the version of the host device is higher, in the case of negative synchronization, application 1011 may be outputted to a display normally.

However, in another example, the host device may transmit installation data for wearable device of a version 3 included in the application package 1021 that the host device retains for a wearable device (positive synchronization). If an installation file (for example, an .apk file) is deleted arbitrarily or by a user setting, the host device accesses a store application 1030 in a server (e.g., an application store) to receive an application A package (App A) and provides an installation file to a wearable device.

The application 1013 (Wearable App B), the version of a wearable device and the version of a host device are identical to each other. Accordingly, even when any one of negative synchronization or positive synchronization is applied to the application 1013, the same result (outputted from the displays of the two devices normally) may be derived.

However, application 1015 (Wearable App C) has a version of an application that is higher than the package version of a host device. When the minimum required version (for example, attribute of requiredPackage 443: minVer) of a required package in a data structure of a wearable device is higher than the version 1 (for example, version 2), in the case of negative synchronization, an application 1015 may not be outputted from a display of a wearable device and/or an HM screen of a host device.

However, in an embodiment of FIG. 10, a host device may receive an application c package corresponding to a version 3 or higher from a server (for example, the application store 1030) and may update the application version of the host device to be higher than the version of a wearable device. In various embodiments of the present disclosure, when the package version of a host device cannot be updated based on an application of a wearable device due to a case that a host device is not connected to a server or a server does not provide a corresponding package, or other different environmental reasons, the host device may replace an application of a wearable device by using an installation file stored in the host device (for example, replaced with the application 1015 of the version 1).

In various embodiments of the present disclosure, even if the application 1011 is installed on a wearable device but the application package 1021 is not installed on a host device, in the case of positive synchronization, the host device may receive a package corresponding to the application 1011 from a server (for example, the application store 1030) to allow the application 1011 to operate normally. In the case of negative synchronization, the application 1011 may not be outputted on the display of the wearable device.

According to various embodiments of the present disclosure, an electronic device may include a management module checking a package equipped in the electronic device and a communication module receiving information on an application operable on the external device from the external device. Herein, the management module may be set to determine whether to synchronize the package or the application on the basis of a comparison result of the checked package and the information.

In various embodiments of the present disclosure, when the version of the package corresponding to the application is higher than the version of the application, the management module may be updated on the basis of the package corresponding to the application of the external device.

In various embodiments of the present disclosure, when the version of the package corresponding to the application is lower than the version of the application, the management module may update the package on the basis of the application from a server.

In various embodiments of the present disclosure, when the version of the package corresponding to the application is lower than the version of the application, the application may be replaced with an application included in the package.

According to various embodiments of the present disclosure, when a host device is connected to an external device, various synchronizations may be possible including a method of not outputting an unsupported item without performing a manufacturer initialization operation or updating to support a maximum item.

The term "module" used in this disclosure, for example, may mean a unit including a combination of at least one of hardware, software, and firmware. The term "module" and the term "unit", "logic", "logical block", "component", or "circuit" may be interchangeably used. A "Module" may be a minimum unit or part of an integrally configured component, may be a minimum unit performing at least one function or part thereof, or may be implemented mechanically or electronically. For example, the module according to various embodiments of the present disclosure may include at least one of an application-specific IC (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in non-transitory computer-readable storage media. When at least one processor (for example, the processor 720) executes an instruction, it may perform a function corresponding to the instruction. The non-transitory computer-readable storage media may include the memory 730, for example. At least part of a programming module may be implemented (for example, executed) by processor 810, for example. At least part of a programming module may include a module, a program, a routine, sets of instructions, or a process to perform at least one function, for example.

The non-transitory computer-readable storage media may include Magnetic Media such as a hard disk, a floppy disk, and a magnetic tape, Optical Media such as Compact Disc ROM (CD-ROM) and Digital Versatile Disc (DVD), Magneto-Optical Media such as Floptical Disk, and a hardware device especially configured to store and perform a program instruction (for example, a programming module) such as ROM, RAM, and flash memory. Additionally, a program instruction may include high-level language code executable by a computer using an interpreter in addition to machine code created by a complier. The hardware device may be configured to operate as at least one software module to perform an operation of this disclosure and vice versa.

A module of a programming module according to various embodiments of the present disclosure may include at least one of the above-mentioned components or additional other components. Or, some programming modules may be omitted. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

According to various embodiments of the present disclosure, in relation to a storage medium storing commands, the commands are set to allow at least one processor to perform at least one operation when executed by at least one processor. The least one operation may include an operation for checking an application installed on a first device, an operation for checking whether a condition that the application requires is satisfied in a second device, and an operation for determining whether the application is outputted from the first device or the second device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile device comprising:
   transceiver; and
   a display;
   a memory storing instructions; and
   at least one processor configured to execute the stored instructions to:
   receive, from a wearable electronic device, application information of an application installed in the wearable electronic device paired with the mobile device,
   determine if a package corresponding to the application is equipped in the mobile device,
   check a set of requirements stored in a data structure of the mobile device for a comparison of the package and the application information, the data structure including package information that the application requires and a minimum version information of each package, and
   control the display to display an item related to the application based on a comparison of the package and the application information.

2. The mobile device of claim 1, wherein the mobile device corresponds to a host device.

3. The mobile device of claim 1, wherein the transceiver is further configured to:
   transmit package information of the package to the wearable electronic device, and
   receive the comparison result from the wearable electronic device.

4. The mobile device of claim 1, wherein the application information comprises information of a package that the application requires and minimum version information of the package.

5. The first electronic device of claim 1, wherein the at least one processor is further configured to execute the stored instructions to control the display to display the item when the first electronic device is connected to the wearable electronic device.

6. The first electronic device of claim 1, wherein the at least one processor is further configured to execute the stored instructions to control the transceiver to transmit the package information to the second electronic device to synchronize the wearable electronic device.

7. A mobile device comprising:
   transceiver;
   a memory storing instructions; and
   at least one processor configured to execute the stored instructions to:
   receive, from a wearable electronic device, application information of an application installed in a wearable electronic device, the application information including a version of an application,
   identify a version of an application package installed in the mobile device and corresponding to the application installed in the wearable electronic device, and
   synchronize the versions of the application and the application package based on a comparison of the version of the application and the version of the application package,
   wherein the application package includes a first data for mobile device and a second data for the wearable electronic device, and the second data corresponds to the application installed in the wearable electronic device.

8. The mobile device of claim 7, wherein the at least one processor is further configured to execute the stored instructions to update the application of the wearable electronic device when the version of the package is higher than the version of the application.

9. The first electronic device of claim 7, wherein the at least one processor is further configured to execute the stored instructions to update the package of the first electronic device when the version of the package is lower than the version of the application.

10. The first electronic device of claim 7, wherein, when the version of the package is lower than the version of the application, the at least one processor is further configured to execute the stored instructions to replace the application with an updated application included in the package.

* * * * *